US010440100B2

(12) United States Patent
Machida

(10) Patent No.: US 10,440,100 B2
(45) Date of Patent: Oct. 8, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Hiroaki Machida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 121 days.

(21) Appl. No.: 15/016,853

(22) Filed: Feb. 5, 2016

(65) Prior Publication Data

US 2017/0006085 A1 Jan. 5, 2017

(30) Foreign Application Priority Data

Jul. 2, 2015 (JP) .................. 2015-133227

(51) Int. Cl.
*H04L 29/08* (2006.01)
(52) U.S. Cl.
CPC .......... *H04L 67/10* (2013.01); *H04L 67/1095* (2013.01); *H04L 67/1097* (2013.01)
(58) Field of Classification Search
CPC ............................ H04L 67/02; H04L 67/1095
USPC ........................................................ 709/217
See application file for complete search history.

(56) References Cited

U.S. PATENT DOCUMENTS

| 2012/0072971 | A1* | 3/2012 | Zhang | H04W 4/08 726/4 |
| 2013/0238745 | A1* | 9/2013 | Ramachandran | H04N 21/2396 709/217 |
| 2014/0012912 | A1* | 1/2014 | Caskey | G06Q 50/22 709/204 |

* cited by examiner

*Primary Examiner* — Adnan M Mirza
(74) *Attorney, Agent, or Firm* — Oliff PLC

(57) ABSTRACT

An information processing apparatus includes a memory, an obtaining unit, a storing unit, and a controller. The memory stores information on plural storage destination devices and plural pieces of condition information in association with each other, wherein each of the plural pieces of condition information indicates a condition of a user who is allowed to access one of the plural storage destination devices. The obtaining unit obtains information on an attribute of a requesting user who requests access to content. The storing unit stores, in response to receipt of the request from the requesting user, the content in a storage destination device associated with condition information whose condition is satisfied by the attribute of the requesting user among the plural storage destination devices. The controller performs control to transmit, to the requesting user, information for accessing the storage destination device in which the content is stored.

16 Claims, 14 Drawing Sheets

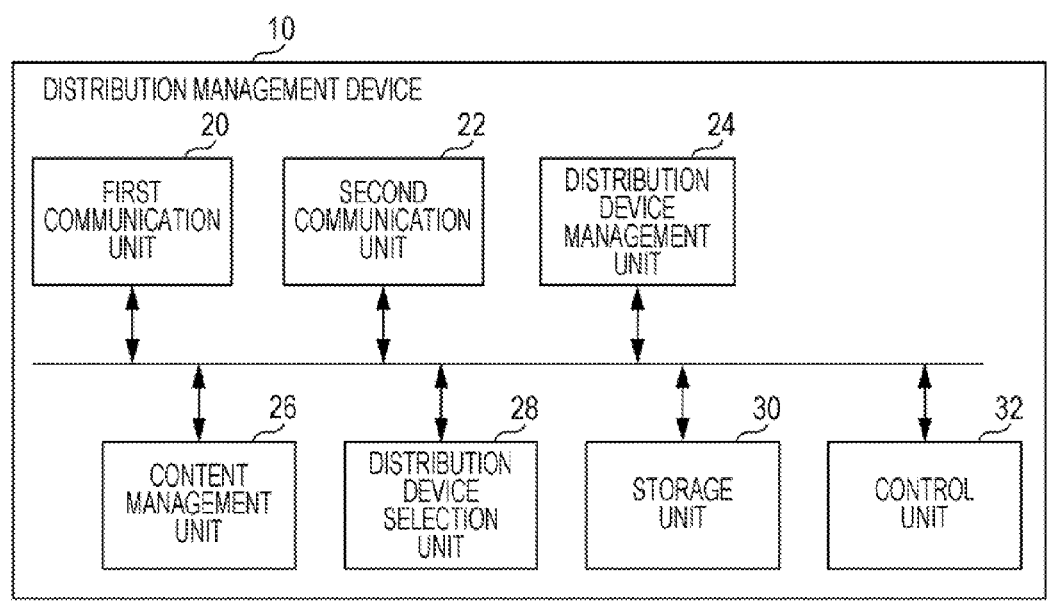

FIG. 4

| CONTENT IDENTIFIER | AVAILABILITY OF INTERNET DISTRIBUTION | AVAILABILITY OF INTRANET DISTRIBUTION |
|---|---|---|
| CONTENT A | OK | OK |
| CONTENT B | NG | OK |
| CONTENT C | OK | NG |

FIG. 5

| CONTENT IDENTIFIER | IDENTIFIER OF CONTENT-ARRANGED DISTRIBUTION DEVICE | URL |
|---|---|---|
| CONTENT A | DISTRIBUTION DEVICE A | http://(FQDN OF DISTRIBUTION DEVICE A)/XXXX/XXX |
| CONTENT A | DISTRIBUTION DEVICE B | http://(FQDN OF DISTRIBUTION DEVICE B)/XXXX/XXX |
| CONTENT C | DISTRIBUTION DEVICE A | http://(FQDN OF DISTRIBUTION DEVICE A)/XXXX/XXX |

FIG. 9

| DISTRIBUTION DEVICE IDENTIFIER | COMMUNICATION PATH (DISTRIBUTION) (DESTINATION) | DOMAIN INFORMATION OF DISTRIBUTION DEVICE | IP ADDRESS RANGE OF DISTRIBUTION DEVICE | COST | PERFORMANCE | ECOLOGICAL SUSTAINABILITY |
|---|---|---|---|---|---|---|
| DISTRIBUTION DEVICE A | INTERNET | cdn-a.xxx.co.jp | xxx.xxx.xxx.xxxx/16 | A | A | C |
| DISTRIBUTION DEVICE B | INTERNET | cdn-b.yyyyy.co.jp | yyy.yyy.yyy.yyy/24 | B | C | A |
| DISTRIBUTION DEVICE C | INTERNET | cdn-c.xxx.com | zzz.zzz.zzz.zzz/24 | C | A | B |
| DISTRIBUTION DEVICE D | INTRANET | intranet.xxx.xxx.jp | ... | A | A | A |

FIG. 10

| USER IDENTIFIER (OR IP ADDRESS) | DOMAIN TO WHICH ACCESS IS ALLOWED | INFORMATION ON IP ADDRESS RANGE FOR DISTRIBUTION DEVICES TO WHICH ACCESS IS ALLOWED |
|---|---|---|
| USER A | ALLOWED: *.xxx.co.jp | |
| USER B | ALLOWED: *.yyyyy.co.jp | xxx.xxx.xxxx/16 |
| USER C | NG: *.com | |
| (OTHER USERS) | (OK FOR ALL) | (OK FOR ALL) |

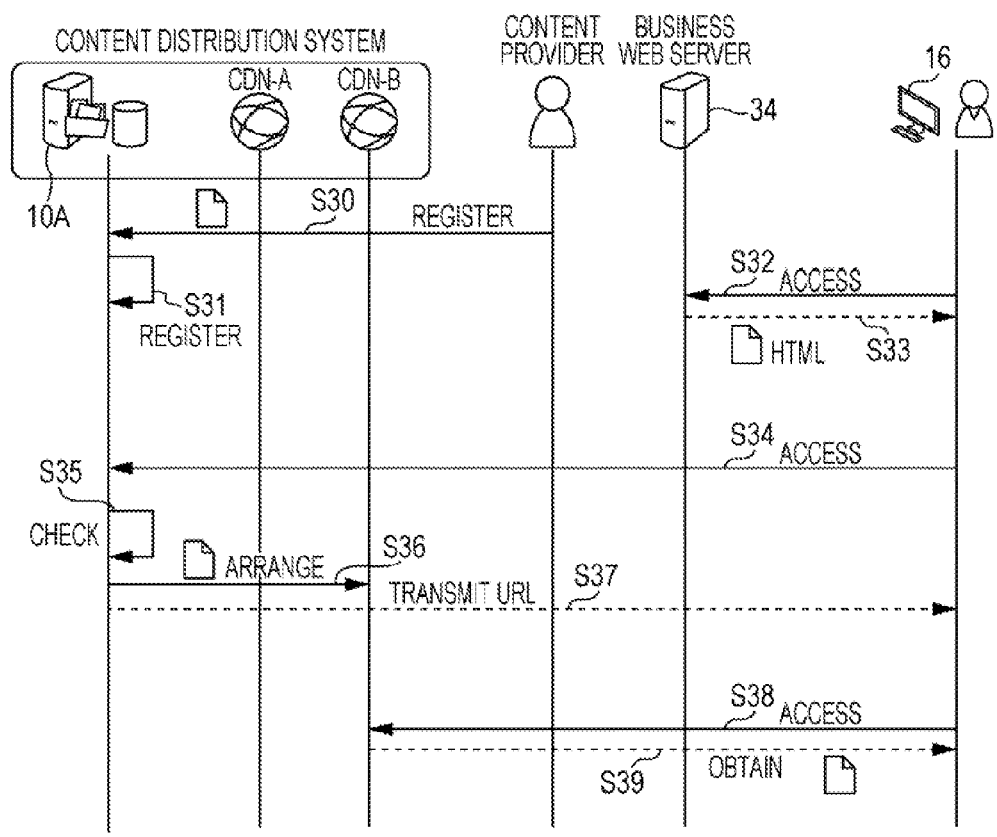

FIG. 14

| DISTRIBUTION DEVICE IDENTIFIER | COMMUNICATION PATH (DISTRIBUTION DESTINATION) | COST | GEOGRAPHIC RESTRICTIONS FOR CONTENT DISTRIBUTION | OTHER ATTRIBUTES |
|---|---|---|---|---|
| DISTRIBUTION DEVICE A | INTERNET | A (DEFAULT) | NO DISTRIBUTION TO CHINA | ... |
| DISTRIBUTION DEVICE B | INTERNET | B | | ... |
| DISTRIBUTION DEVICE C | INTERNET | C | | ... |
| DISTRIBUTION DEVICE D | INTRANET | A | | ... |

FIG. 16

| CONTENT IDENTIFIER | AVAILABILITY OF INTERNET DISTRIBUTION | AVAILABILITY OF INTRANET DISTRIBUTION | CONDITIONS FOR INTERNET DISTRIBUTION | RESTRICTIONS |
|---|---|---|---|---|
| CONTENT A | OK | OK | AUTHENTICATED USERS ONLY | ENCRYPTION WITH PUBLIC KEY OF USER |
| CONTENT B | OK | OK | ACCESS SOURCE IP ADDRESS RANGE OF CLIENT: xxx.xxx.xxx/16 | 24-HOUR EXPIRY |
| CONTENT C | OK | OK | SPECIFIC AUTHENTICATED USERS ONLY | 1-HOUR EXPIRY |

| CONTENT IDENTIFIER | USER IDENTIFIER |
|---|---|
| CONTENT C | USER A |
| CONTENT C | USER X |
| CONTENT C | USER Y |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-133227 filed Jul. 2, 2015.

BACKGROUND (i) Technical Field

The present invention relates to an information processing apparatus, an information processing method, and a non-transitory computer readable medium.

(ii) Related Art

In a content distribution system, content to be distributed is generally stored on a certain storage destination device in advance, and a request for the content is submitted to the storage destination device by a user at a distribution destination.

Each storage destination device has characteristics, and users access the storage destination device from various locations, which may cause limited access to a storage destination device on which the desired content is stored. Access to the target storage destination device may be limited due to, for example, Internet protocol (IP) address restrictions, domain restrictions, or geographic restrictions.

SUMMARY

According to an aspect of the invention, there is provided an information processing apparatus including a memory, an obtaining unit, a storing unit, and a controller. The memory stores information on plural storage destination devices and plural pieces of condition information in association with each other, wherein each of the plural pieces of condition information indicates a condition of a user who is allowed to access one of the plural storage destination devices. The obtaining unit obtains information on an attribute of a requesting user who requests access to content. The storing unit stores, in response to receipt of the request from the requesting user, the content in a storage destination device associated with condition information whose condition is satisfied by the attribute of the requesting user among the plural storage destination devices. The controller performs control to transmit, to the requesting user, information for accessing the storage destination device in which the content is stored.

BRIEF DESCRIPTION OF THE DRAWINGS

Exemplary embodiments of the present invention will be described in detail based on the following figures, wherein:

FIG. 2 is a block diagram illustrating a distribution management device according to the first exemplary embodiment;

FIG. 3 illustrates an example of a distribution device management table;

FIG. 4 illustrates an example of a content management table;

FIG. 5 illustrates an example of a content arrangement location management table;

FIG. 9 illustrates an example of a distribution device management table;

FIG. 10 illustrates an example of an access restriction management table;

FIG. 11 illustrates an example of a user interest management table;

FIG. 12 is a sequence diagram illustrating an overview of a process according to the second exemplary embodiment;

FIG. 14 illustrates an example of a distribution device management table;

FIG. 16 illustrates an example of a content management table;

DETAILED DESCRIPTION

First Exemplary Embodiment

Figure 1:
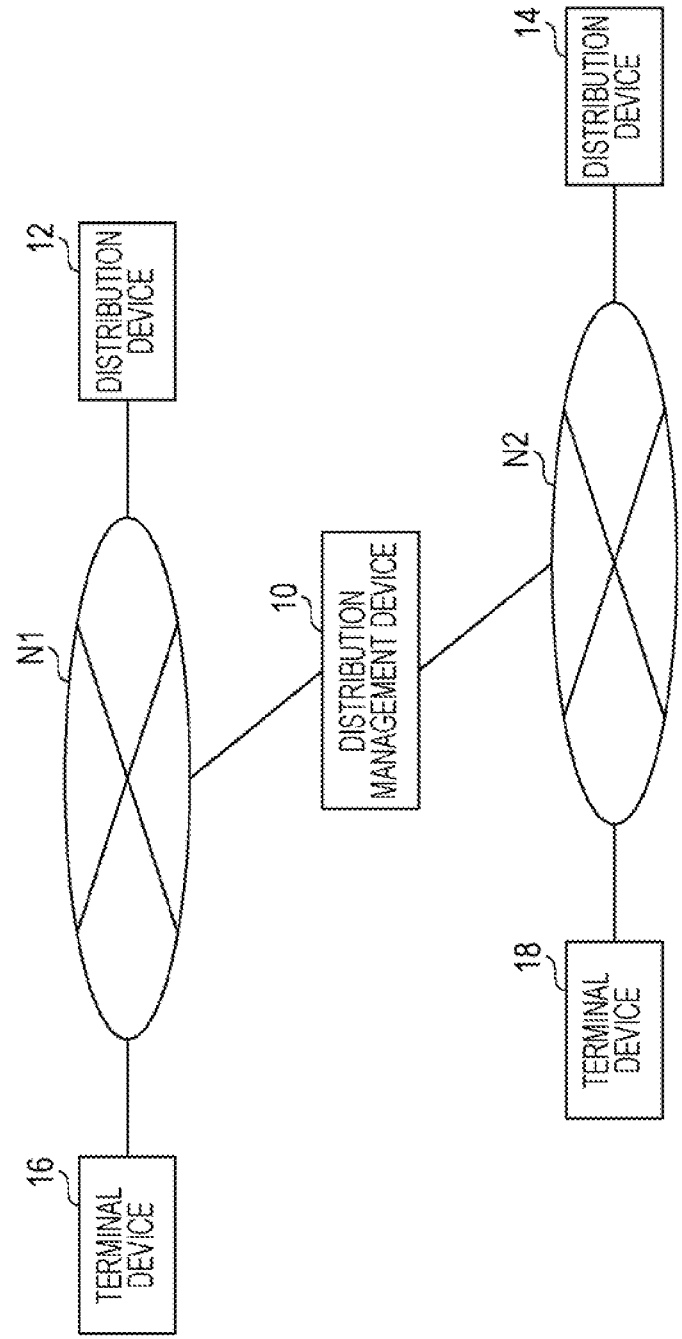
FIG. 1 is a block diagram illustrating a content distribution system according to a first exemplary embodiment of the present invention.

FIG. 1 illustrates an example of a content distribution system according to a first exemplary embodiment of the present invention. The content distribution system includes a distribution management device 10 serving as an information processing apparatus, and one or more distribution devices (distribution devices 12 and 14, by way of example) serving as storage destination devices. The distribution management device 10 and the distribution device 12 are connected to a communication path N1. The communication path N1 is the Internet, for example. One or more terminal devices 16 are connected to the communication path N1. The distribution management device 10 and the distribution device 14 are connected to a communication path N2. The communication path N2 is an intranet, for example. One or more terminal devices 18 are connected to the communication path N2. Multiple distribution devices may be connected to each of the communication paths N1 and N2.

The distribution management device 10 has a function of storing content to be distributed on a specific distribution device in accordance with a condition regarding the content, a user at a distribution destination, or the like.

The distribution device 12 has a function of storing data of content and distributing the content to a terminal device at a distribution destination via the Internet. That is, the distribution device 12 may be a distribution device for Internet users. For example, the distribution device 12 distributes content by using a content delivery network (CDN).

The distribution device 14 has a function of storing data of content and distributing the content to a terminal device at a distribution destination via an intranet. For example, when the communication path N2 is an in-house network, the distribution device 14 may be a distribution device for in-house users.

The terminal devices 16 and 18 are devices such as personal computers (PCs), tablet PCs, smartphones, or mobile phones, and have a function of transmitting and receiving data to and from other devices.

In the content distribution system, content to be distributed is provided from a provider to the distribution management device 10, and the distribution management device 10 stores the content on a specific distribution device. The specific distribution device then distributes the content to a user (or terminal device) at a distribution destination.

The configuration of the distribution management device 10 will be described in detail hereinafter.

FIG. 2 illustrates the configuration of the distribution management device 10 according to the first exemplary embodiment.

A first communication unit 20 is a communication interface, and has a function of transmitting and receiving data to and from any other device via the communication path N1 (e.g., the Internet).

A second communication unit 22 is a communication interface, and has a function of transmitting and receiving data to and from any other device via the communication path N2 (e.g., an intranet).

A distribution device management unit 24 holds distribution device attribute information indicating the attributes of distribution devices, and manages the distribution devices. The distribution device attribute information is information indicating, for example, communication paths supported by the distribution devices, and specifically is information indicating that each of the distribution devices is a device for Internet distribution or a device for intranet distribution. For example, each time a new distribution device is registered in the content distribution system, the attribute information of the distribution device is newly held in the distribution device management unit 24.

A content management unit 26 holds content attribute information indicating the attribute of content to be distributed and content arrangement information indicating a location in which the content is arranged (or stored) (hereinafter referred to as an "arrangement location" or a "storage location"), and manages individual pieces of content. The content attribute information is, for example, information indicating that the corresponding content supports Internet distribution or intranet distribution. For example, each time a new piece of content is registered in the distribution management device 10, the attribute information of the piece of content is newly held in the content management unit 26. The content arrangement information is information indicating the storage location of the corresponding content, and is information for identifying a distribution device, such as an identifier or a Uniform Resource Locator (URL). For example, each time a piece of content is arranged (or stored) on a distribution device, content arrangement information concerning the piece of content is created and is held in the content management unit 26.

A distribution device selection unit 28 has a function of storing content to be distributed on a specific distribution device in accordance with distribution device attribute information and content attribute information. For example, when a terminal device at a distribution destination accesses the distribution management device 10 via the Internet, the distribution device selection unit 28 stores the content to be distributed on the distribution device 12 for Internet distribution. When a terminal device at a distribution destination accesses the distribution management device 10 via an intranet, the distribution device selection unit 28 stores the content to be distributed on the distribution device 14 for intranet distribution. Alternatively, when the content to be distributed is content for Internet distribution, the distribution device selection unit 28 stores the content to be distributed on the distribution device 12. When the content to be distributed is content for intranet distribution, the distribution device selection unit 28 stores the content to be distributed on the distribution device 14.

A storage unit 30 is a storage device such as a hard disk. The storage unit 30 stores, for example, data of content provided from a content provider.

A control unit 32 controls the operation of the individual units of the distribution management device 10.

FIG. 3 illustrates an example of a distribution device management table. The distribution device management table corresponds to an example of the distribution device attribute information, and is information stored in the distribution device management unit 24. In the distribution device management table, for each distribution device, a distribution device identifier for identifying the distribution device and information indicating a communication path (for either Internet distribution or intranet distribution) supported by the distribution device are associated with each other. In the distribution device management table, a "distribution device A" is a device supporting Internet distribution and corresponds to, for example, the distribution device 12, and a "distribution device B" is a device supporting intranet distribution and corresponds to, for example, the distribution device 14. Each time a new distribution device is registered in the content distribution system, information related to the distribution device is added to the distribution device management table.

FIG. 4 illustrates an example of a content management table. The content management table is an example of the content attribute information, and is information stored in the content management unit 26. In the content management table, for each piece of content, a content identifier for identifying the piece of content and information indicating a communication path supported by the piece of content are associated with each other. For example, "content A" supports both Internet distribution and intranet distribution. In contrast, "content B" supports intranet distribution but does not support Internet distribution. Further, "content C" supports Internet distribution but does not support intranet distribution. A communication path for each piece of content is determined by, for example, a provider of the piece of content. It will be anticipated that the communication path may be determined by an administrator of the content distribution system or any other suitable person. For example, each time a new piece of content is registered in the distribution management device 10, the attribute information of the piece of content is added to the content management table.

FIG. 5 illustrates an example of a content arrangement location management table. The content arrangement location management table is an example of the content arrangement information, and is information stored in the content management unit 26. In the content arrangement location management table, for each piece of content, a content identifier for identifying the piece of content, a distribution device identifier for identifying a distribution device on which the piece of content is arranged (or stored), and a URL indicating the arrangement location (or storage location) of the piece of content are associated with one another. For example, the "content A" is stored on both the distribution devices A and B. For example, each time a piece of content is arranged (or deployed) on a distribution device, information indicating the arrangement location (or the storage location) of the piece of content is added to the content arrangement location management table.

Figure 6:
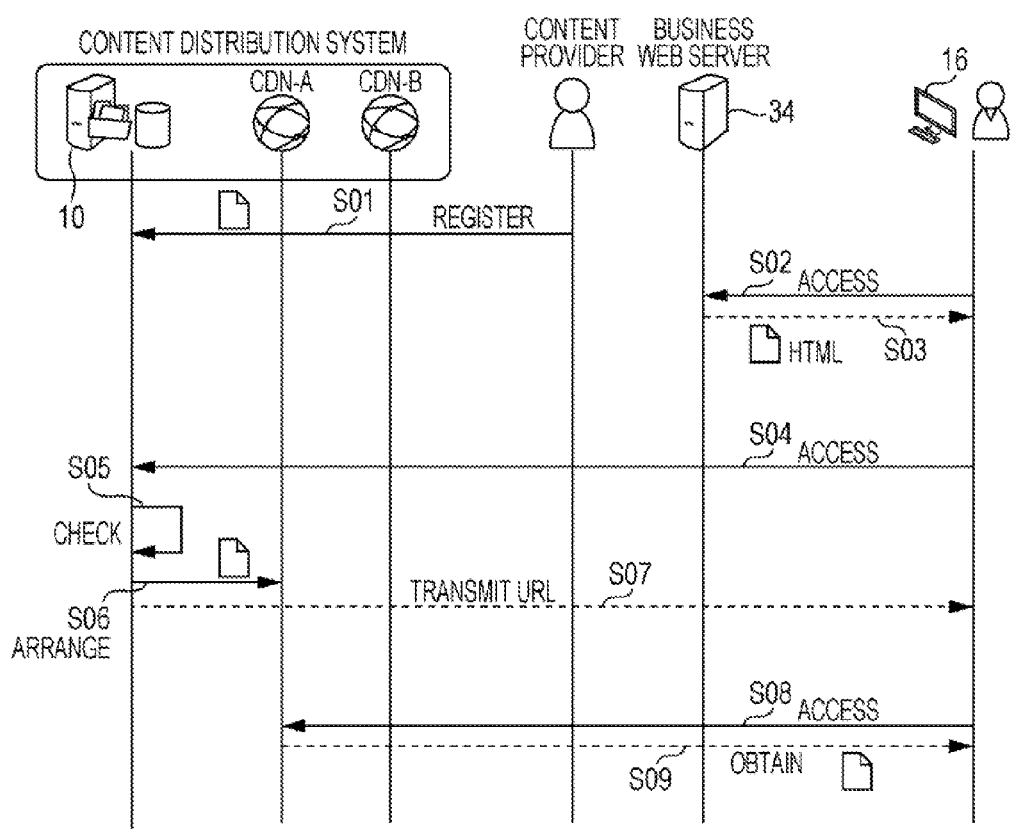
FIG. 6 is a sequence diagram illustrating an overview of a process according to the first exemplary embodiment.

A process performed by the content distribution system according to the first exemplary embodiment will be described hereinafter. FIG. 6 is a sequence diagram illustrating an overview of the process.

First, a content provider uses a device such as a terminal device to send the content to be distributed to the distribution management device 10 for registration (S01). The content is stored in the storage unit 30. For example, content constituting a website (for example, content written in JavaScript (registered trademark) or any other language) is registered. In addition to the content, content attribute information is sent to the distribution management device 10 for registration. For example, the content provider determines the details of the content attribute information. In a case where the content is distributed via the Internet, the content attribute information includes information indicating that the content supports Internet distribution. In a case where the content is distributed via an intranet, the content attribute information includes information indicating that the content supports intranet distribution. When new content is sent to the distribution management device 10, the content management unit 26 adds the attribute information of the content to the content management table.

Then, a user of the content (i.e., a user at a distribution destination) accesses, for example, a business Web server 34 by using a terminal device (S02). The access is implemented by using, for example, a web browser. By way of example, the terminal device 16 is used. In the business Web server 34, a Hypertext Markup Language (HTML) file is dynamically created and is sent to a web browser on the terminal device 16 (S03). The HTML file contains the URL of the distribution management device 10 as a URL for obtaining the content written in JavaScript or any other language. The HTML file further includes a content identifier for identifying the content to be distributed.

Then, the web browser on the terminal device 16 accesses the URL contained in the HTML file (S04). As described above, since the URL is the URL of the distribution management device 10, access from the terminal device 16 to the distribution management device 10 is achieved. At this time, the content identifier of the content to be distributed is sent from the terminal device 16 to the distribution management device 10.

In the distribution management device 10, the distribution device selection unit 28 checks the management information (i.e., the distribution device management table and the content management table) (S05), and arranges (or stores) the content to be distributed (i.e., the content corresponding to the content identifier sent from the terminal device 16) on a specific distribution device (S06) in accordance with a condition regarding the content to be distributed or the user. For example, it is assumed that the content distribution system includes CDN-A and CDN-B serving as distribution devices. By way of example, the CDN-A and the CDN-B are connected to the Internet and have a function of distributing content via the Internet. The CDN-A is a default CDN (or distribution device), and the terminal device 16 has a function of receiving content distributed from the CDN-A. In this case, the content to be distributed is arranged (or stored) on the default CDN-A. When the content to be distributed is arranged on the CDN-A, the content management unit 26 adds content arrangement information concerning the content to the content arrangement location management table. Then, a URL indicating the arrangement location of the content is sent from the distribution management device 10 to the terminal device 16 (S07). The URL is information indicating a storage location on the CDN-A. In a case where the content to be distributed has already been arranged on the CDN-A, the arrangement process in step S06 is not necessary.

Then, the web browser on the terminal device 16 accesses the URL sent from the distribution management device 10 (S08). Since the URL indicates the storage location on the CDN-A, access from the terminal device 16 to the CDN-A is achieved. Then, the web browser obtains the content from the storage location indicated by the URL (S09).

Figure 7:
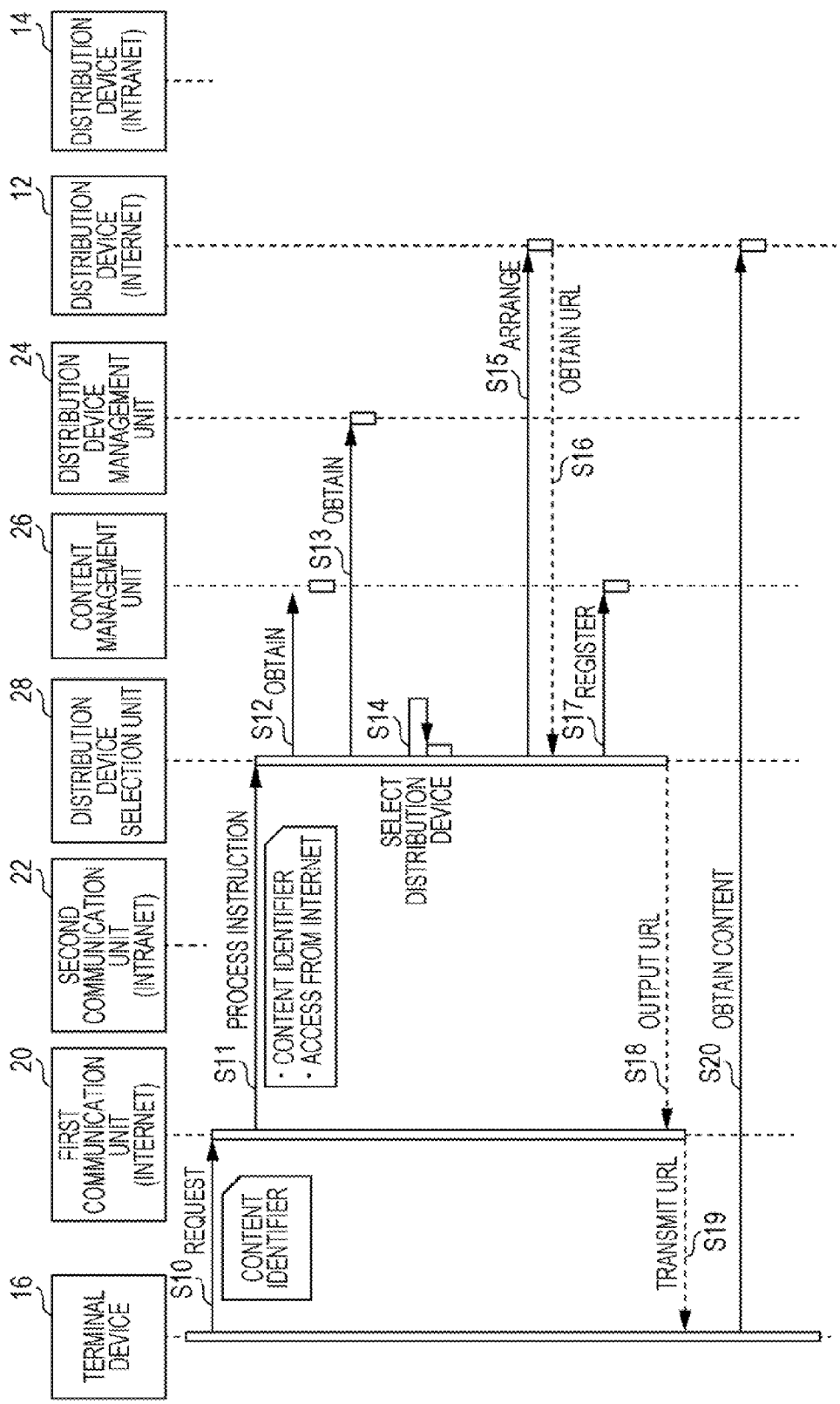
FIG. 7 is a sequence diagram illustrating the details of the process according to the first exemplary embodiment.

The process performed by the content distribution system according to the first exemplary embodiment will be described in detail hereinafter. FIG. 7 is a sequence diagram illustrating the details of the process. The processing after step S04 illustrated in FIG. 6 will be described here. That is, it is assumed that the content to be distributed has been registered in the distribution management device 10 and has been stored in the storage unit 30. It is also assumed that the user at the distribution destination uses the terminal device 16.

First, the terminal device 16 accesses the distribution management device 10 via the communication path N1, which is the Internet, and sends information indicating a request for obtaining the content to be distributed to the distribution management device 10 (S10). The information indicating the request includes the content identifier of the content to be distributed.

In the distribution management device 10, the information indicating the request is accepted by the first communication unit 20, and, in response to the acceptance, a process instruction is issued to the distribution device selection unit 28 (S11). That is, a distribution device selection function is invoked, and the process is subsequently performed by the distribution device selection unit 28. The process instruction (i.e., an invocation instruction) includes the content identifier and access information indicating that the access from the terminal device 16 is provided via the Internet.

The distribution device selection unit 28 uses the content identifier as a search key to obtain the content attribute information of the content to be distributed from the content management table stored in the content management unit 26 (S12). The content attribute information is referred to, allowing identification of a communication path (for either Internet distribution or intranet distribution) supported by the content to be distributed.

The distribution device selection unit 28 further obtains distribution device attribute information from the distribution device management table stored in the distribution device management unit 24 (S13). The distribution device attribute information is referred to, allowing identification of a communication path (for either Internet distribution or intranet distribution) supported by each distribution device.

By referring to the content attribute information and the distribution device attribute information, the distribution device selection unit 28 selects a distribution device which is suitable to distribute to the terminal device 16 the content to be distributed (S14).

For instance, the content to be distributed is "content A". Referring to the content management table illustrated in FIG. 4, the "content A" supports both Internet distribution and intranet distribution. Thus, the "content A" supports distribution to the terminal device 16, which has accessed via the Internet. In this case, the distribution of the "content A" to the terminal device 16 is allowed. Referring to the distribution device management table illustrated in FIG. 3, furthermore, the "distribution device A" (for example, the distribution device 12) supports Internet distribution. In this case, the "distribution device A" is selected as the arrangement destination device (or storage destination device) on which the "content A" is arranged (or stored).

In a case where the content to be distributed is content that does not support Internet distribution, such as "content B", the distribution of the content (for example, the "content B") to the terminal device 16 is prohibited. In addition, in a case where no distribution device supporting Internet distribution has been registered in the content distribution system, the distribution of the content to the terminal device 16 is prohibited. In these cases, information indicating the prohibition of the distribution of the content to be distributed is sent from the distribution management device 10 to the terminal device 16 and is displayed.

In the following, by way of example, the content to be distributed is the "content A", and the "distribution device A" has been selected as the arrangement destination device (or storage destination device) on which the "content A" is arranged (or stored).

In a case where the "content A" has not been arranged (or stored) on the "distribution device A" (for example, the distribution device 12), the distribution device selection unit 28 sends the "content A" to the "distribution device A" to store the "content A" on the "distribution device A" (S15). Then, the distribution device selection unit 28 obtains from the "distribution device A" the URL indicating the storage location of the "content A" on the "distribution device A" (S16). The URL is registered in the content arrangement location management table by the content management unit 26 (S17). Accordingly, the state of the arrangement of the "content A" is managed in the content arrangement location management table.

Then, the distribution device selection unit 28 outputs the URL indicating the storage location of the "content A" (S18). The URL is transmitted to the terminal device 16 from the first communication unit 20 (S19). Then, the terminal device 16 accesses the "distribution device A" having the storage location indicated by the URL, and obtains the "content A" from the "distribution device A" (S20).

As described above, according to the first exemplary embodiment, the content to be distributed is arranged (or stored) on a specific distribution device so that the content is distributed to a terminal device at a distribution destination in accordance with the communication environment (e.g., the communication path used by the terminal device) of the content user (i.e., the terminal device at the distribution destination). That is, the content to be distributed is arranged on a distribution device that the terminal device can access. This may eliminate the need for the content provider, the administrator, or any other suitable entity to manually select a distribution device suitable for the distribution of the content while taking into account a distribution device that the content user can access. For example, even if the content provider, the administrator, or any other suitable entity has no knowledge about a distribution device that the content user can access, the content is arranged on a distribution device suitable for the distribution of the content. In addition, the content is arranged on a distribution device suitable for the attribute of the content. Accordingly, the content is provided to the terminal device at the distribution destination via a communication path suitable for the content.

Second Exemplary Embodiment

Figure 8:
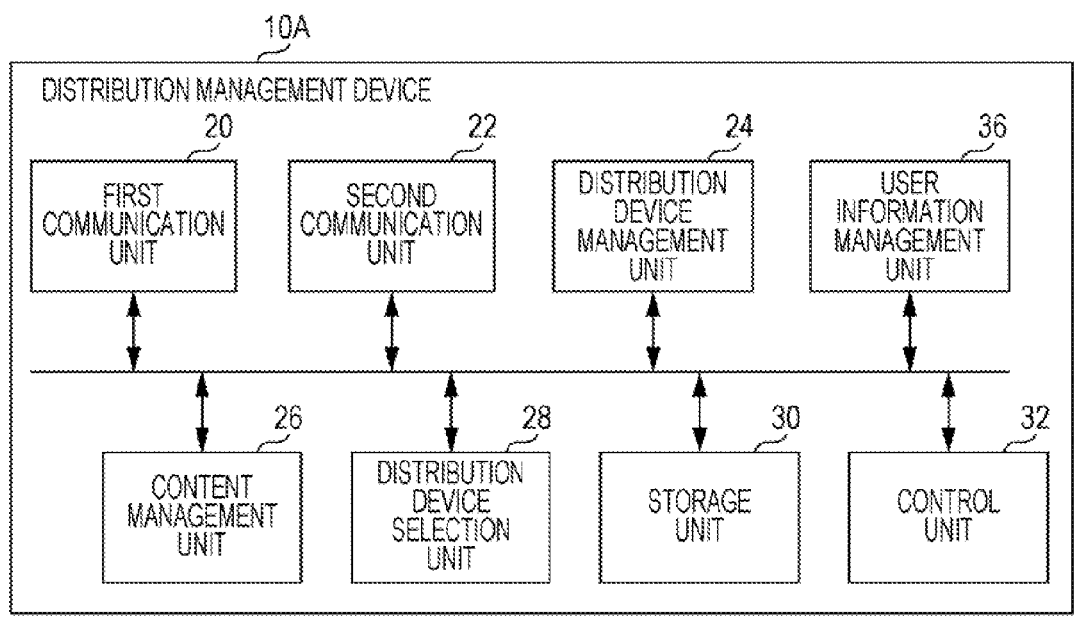
FIG. 8 is a block diagram illustrating a distribution management device according to a second exemplary embodiment.

Next, a content distribution system according to a second exemplary embodiment will be described. FIG. 8 illustrates an example of the distribution management device according to the second exemplary embodiment. In the content distribution system according to the second exemplary embodiment, a distribution management device 10A is used instead of the distribution management device 10 illustrated in FIG. 2. In the second exemplary embodiment, a distribution device is selected by taking into account access restrictions for a content user (a user at a distribution destination) or the user's interest. The configuration of the distribution management device 10A will be described hereinafter.

The first communication unit 20 and the second communication unit 22 have the same or substantially the same functions as those of the first communication unit 20 and the second communication unit 22 according to the first exemplary embodiment.

The distribution device management unit 24 holds distribution device attribute information indicating the attributes of distribution devices, and manages the distribution devices. In the second exemplary embodiment, the distribution device attribute information includes, for example, information indicating communication paths supported by the distribution devices, information indicating communication ranges supported by the distribution devices, measure information indicating measures concerning the distribution devices, and other information. For example, each time a new distribution device is registered in the content distribution system, the attribute information of the distribution device is newly held in the distribution device management unit 24. Examples of the information indicating the communication range of each distribution device include the domain information of the distribution device, and information indicating the IP address range supported by the distribution device. The measure information is information indicating measures of the distribution device, such as cost, performance, and ecological sustainability.

The content management unit 26 has the same or substantially the same function as that of the content management unit 26 according to the first exemplary embodiment.

A user information management unit 36 holds access restriction information and user interest information for each user, and manages information related to individual users. The access restriction information includes, for example, domain information indicating a domain to which access by a user at a distribution destination (or a terminal device at a distribution destination) is allowed, and information indicating the IP address range to which access by the user at the distribution destination is allowed. The user interest information is information indicating a measure on which the user places emphasis for distribution devices. Examples of the measure include cost, performance, and ecological sustainability, as described above.

The distribution device selection unit 28 has a function of storing content to be distributed on a specific distribution device in accordance with the distribution device attribute information, the content attribute information, the access restriction information, and the user interest information. The distribution device selection unit 28 arranges (or stores) the content to be distributed on, for example, a distribution device included in the domain or IP address range to which access by the terminal device at the distribution destination is allowed, the distribution device being a device whose measure matches the measure on which the user places emphasis.

The storage unit 30 and the control unit 32 have the same or substantially the same functions as those of the storage unit 30 and the control unit 32 according to the first exemplary embodiment, respectively.

FIG. 9 illustrates an example of a distribution device management table. The distribution device management table corresponds to an example of the distribution device attribute information, and is information stored in the distribution device management unit 24. In the distribution device management table, for each distribution device, a distribution device identifier for identifying the distribution device, information indicating a communication path (for either Internet distribution or intranet distribution) supported by the distribution device, domain information indicating the domain of the distribution device, information indicating the IP address range supported by the distribution device, information indicating the cost of the distribution device, information indicating the performance of the distribution device, and information indicating the ecological sustainability of the distribution device are associated with one another. Each time a new distribution device is registered in the content distribution system, information related to the distribution device is added to the distribution device management table.

In the distribution device management table, for example, a "distribution device A" is a device supporting Internet distribution. The domain of the "distribution device A" is "cdn-a.xxx.co.jp", and the IP address range supported by the "distribution device A" is "xxx.xxx.xxx.xxxx/16". Further, the level of the "cost" of the "distribution device A" is "A", the level of the "performance" is "A", and the level of the "ecological sustainability" is "C". For example, level A is a high level, level B is an intermediate level, and level C is a low level.

The "cost" is a cost required when the corresponding distribution device is used. The level of the "cost" is determined on the basis of, for example, a predetermined fee standard. As to the "cost", level A indicates low cost, level B indicates intermediate cost, and level C indicates high cost. For example, since the "cost" of the "distribution device A" has level A, the cost spent when the "distribution device A" is used is set low.

The "performance" is the performance (such as the communication speed) of the corresponding distribution device. The level of the "performance" is determined on the basis of, for example, a predetermined performance standard. As to the "performance", level A indicates high performance, level B indicates intermediate performance, and level C indicates low performance. For example, since the "performance" of the "distribution device A", the "distribution device C", and the "distribution device D" has level A, the performance of the "distribution device A", the "distribution device C", and the "distribution device D" is set high.

The "ecological sustainability" is a measure determined on the basis of, for example, a predetermined environment standard or the like, and is, for example, a measure regarding $CO_2$ emissions per unit power generated, power saving performance, or the like. As to the "ecological sustainability", level A indicates high environmental performance (for example, low $CO_2$ emissions), level B indicates intermediate environmental performance, and level C indicates low environmental performance.

FIG. 10 illustrates an example of an access restriction management table. The access restriction management table is an example of the access restriction information, and is stored in the user information management unit 36. In the access restriction management table, for each user or for each terminal device, a user identifier for identifying the user or the IP address of the terminal device, information indicating the domain to which access by the user or the terminal device is allowed, and information indicating the IP address range to which access by the user or the terminal device is allowed are associated with one another. For example, the domain to which access by a "user A" is allowed is "*.xxx.co.jp". No access restriction is set for IP addresses. The access restriction information may be obtained in advance or may be obtained dynamically.

FIG. 11 illustrates an example of a user interest management table. The user interest management table is an example of the user interest information, and is stored in the user information management unit 36. In the user interest management table, for each user or for each terminal device, a user identifier for identifying the user or the IP address of the terminal device, and information indicating the measure on which the user places emphasis are associated with each other. For example, the measure on which the "user A" and a "user C" place emphasis is "performance".

A process performed by the content distribution system according to the second exemplary embodiment will be described hereinafter. FIG. 12 is a sequence diagram illustrating an overview of the process.

First, as in the first exemplary embodiment, a content provider uses a device such as a terminal device to send content to be distributed to the distribution management device 10A for registration (S30). The content is stored in the storage unit 30. In addition, as in the first exemplary embodiment, content attribute information is also sent to the distribution management device 10A for registration. In the second exemplary embodiment, furthermore, in addition to the content, information related to a user at a distribution destination, namely, access restriction information and user interest information, is also sent to the distribution management device 10A for registration (S31). For example, the content provider determines the details of the access restriction information and the user interest information. When new content is sent to the distribution management device 10A, in the distribution management device 10A, the content management unit 26 adds the attribute information of the content to the content management table. The user information management unit 36 further adds the access restriction information to the access restriction management table, and the user interest information to the user interest management table.

Then, as in the first exemplary embodiment, the content user (the user at the distribution destination) accesses, for example, the business Web server 34 by using a terminal device (S32). The access is implemented by using, for example, a web browser. By way of example, the terminal device 16 is used. In the business Web server 34, an HTML file is dynamically created and is sent to a web browser on the terminal device 16 (S33). The HTML file contains the URL of the distribution management device 10A as a URL for obtaining the content. The HTML file further includes a content identifier for identifying the content to be distributed.

Then, the web browser on the terminal device 16 accesses the URL contained in the HTML file (S34). As described above, since the URL is the URL of the distribution management device 10A, access from the terminal device 16 to the distribution management device 10A is achieved. At this time, the content identifier of the content to be distributed is sent from the terminal device 16 to the distribution management device 10A.

In the distribution management device 10A, the distribution device selection unit 28 checks the management information (i.e., the distribution device management table, the content management table, the access restriction management table, and the user interest management table) (S35), and arranges (or stores) the content to be distributed (i.e., the content corresponding to the content identifier sent from the terminal device 16) on a specific distribution device (S36) in accordance with a condition regarding the content to be distributed or the user at the distribution destination. For example, it is assumed that the content distribution system includes CDN-A and CDN-B serving as distribution devices. By way of example, the CDN-A and the CDN-B are connected to the Internet and have a function of distributing content via the Internet. The CDN-A is a default CDN (or distribution device), and supports Internet distribution to all over the world, the cost of which is relatively low. The CDN-B supports an IP address range only within a certain country (for example, Japan), the cost of which is intermediate. For example, the CDN suitable for the user at the distribution destination is the CDN-B rather than the default CDN-A, according to the characteristics of the distribution devices (the CDN-A and the CDN-B), the attribute of the content, access restrictions, and the user's interest. In this case, the content to be distributed is arranged (or stored) on the CDN-B. When the content to be distributed is arranged on the CDN-B, the content management unit 26 adds content arrangement information concerning the content to the content arrangement location management table. Then, a URL indicating the arrangement location of the content is sent from the distribution management device 10A to the terminal device 16 (S37). The URL is information indicating a storage location on the CDN-B. In a case where the content to be distributed has already been arranged on the CDN-B, the arrangement process in step S36 is not necessary.

Then, the web browser on the terminal device 16 accesses the URL sent from the distribution management device 10A (S38). Since the URL indicates the storage location on the CDN-B, access from the terminal device 16 to the CDN-B is achieved. Then, the web browser obtains the content from the storage location indicated by the URL (S39).

Figure 13:
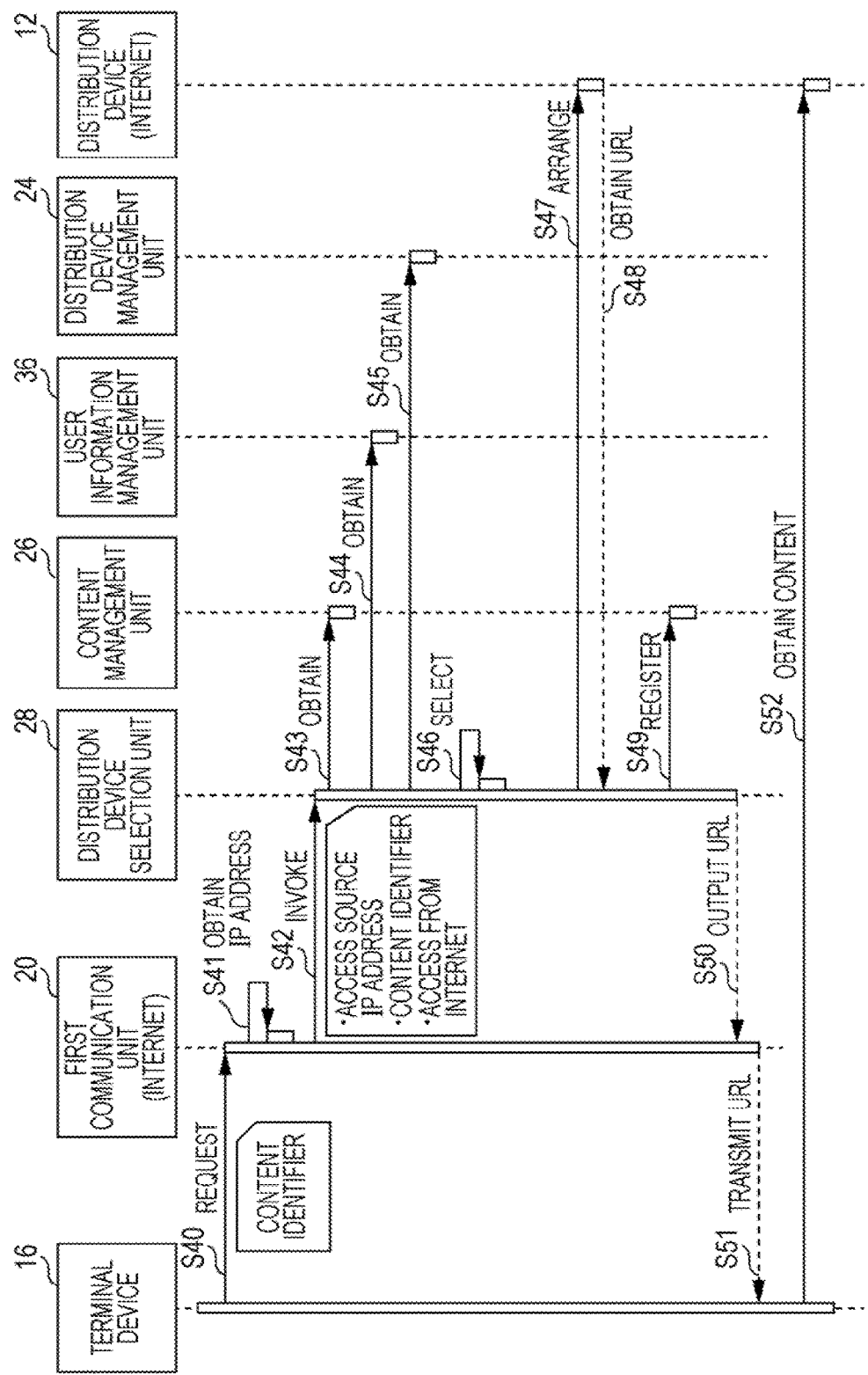
FIG. 13 is a sequence diagram illustrating the details of the process according to the second exemplary embodiment.

The process performed by the content distribution system according to the second exemplary embodiment will be described in detail hereinafter. FIG. 13 is a sequence diagram illustrating the details of the process. The processing after step S34 illustrated in FIG. 12 will be described here. That is, it is assumed that the content to be distributed has been registered in the distribution management device 10A and has been stored in the storage unit 30. It is also assumed that the user at the distribution destination uses the terminal device 16.

First, the terminal device 16 accesses the distribution management device 10A via the communication path N1, which is the Internet, and sends information indicating a request for obtaining the content to be distributed to the distribution management device 10A (S40). The information indicating the request includes the content identifier of the content to be distributed.

In the distribution management device 10A, the information indicating the request is accepted by the first communication unit 20. In response to the acceptance, the first communication unit 20 obtains the IP address of the access source or the user identifier of the user at the access source (S41). The IP address or the user identifier is obtained by using a method such as Secure Sockets Layer (SSL) client authentication. Accordingly, the IP address of the terminal device 16 or the user identifier of the user at the distribution destination is obtained by the first communication unit 20. In addition, a process instruction is issued to the distribution device selection unit 28 (S42). That is, a distribution device selection function is invoked, and the process is subsequently performed by the distribution device selection unit 28. The process instruction (i.e., an invocation instruction) includes the content identifier, the IP address of the terminal device 16 or the user identifier of the user at the distribution destination, and access information indicating that the access from the terminal device 16 is provided via the Internet.

The distribution device selection unit 28 uses the content identifier as a search key to obtain the content attribute information of the content to be distributed from the content management table stored in the content management unit 26 (S43). The content attribute information is referred to, allowing identification of a communication path (for either Internet distribution or intranet distribution) supported by the content to be distributed.

Further, the distribution device selection unit 28 uses the user identifier of the user at the distribution destination or the IP address of the terminal device 16 as a search key to obtain access restriction information from the access restriction management table stored in the user information management unit 36 (S44). Further, the distribution device selection unit 28 uses the user identifier or the IP address as a search key to obtain user interest information from the user interest management table stored in the user information management unit 36 (S44). The access restriction information is referred to, allowing identification of the domain or IP address range to which access by the terminal device 16 is allowed. In addition, the user interest information is referred to, allowing identification of the measure on which the user at the distribution destination places emphasis.

The distribution device selection unit 28 further obtains distribution device attribute information from the distribution device management table stored in the distribution device management unit 24 (S45). The distribution device attribute information is referred to, allowing identification of a communication path (for either Internet distribution or intranet distribution) supported by each distribution device.

Then, by referring to the content attribute information, the access restriction information, the user interest information, and the distribution device attribute information, the distribution device selection unit 28 selects a distribution device which is suitable to distribute to the terminal device 16 the content to be distributed (S46).

In a case where the access restriction information of the user at the distribution destination has been registered in the access restriction management table, a distribution device satisfying a condition for the access restrictions indicated by the access restriction information is selected. In a case where the user interest information of the user at the distribution destination has been registered in the user interest management table, a distribution device satisfying a condition for the interest indicated by the user interest information is selected. In a case where the access restriction information and user interest information of the user at the distribution destination have been registered, a distribution device satisfying both the conditions for the access restrictions and the user's interest is selected.

For instance, the content to be distributed is "content A". Referring to the content management table illustrated in FIG. 4, the "content A" supports both Internet distribution and intranet distribution. Thus, the "content A" supports distribution to the terminal device 16, which has accessed via the Internet. In addition, the user at the distribution destination is a "user A", by way of example. Referring to the access restriction management table illustrated in FIG. 10, the domain to which access by the "user A" is allowed is "*.xxx.co.jp", and no restriction is imposed on the IP address range. Referring to the user interest management table illustrated in FIG. 11, the measure on which the "user A" places emphasis is "performance". Further, referring to the distribution device management table illustrated in FIG. 9, the "distribution device A" supports Internet distribution, the domain of the "distribution device A" is "cdn-a.xxx-.co.jp", and the performance level of the "distribution device A" is "A". Accordingly, the "distribution device A" is a distribution device satisfying conditions concerning the "content A" and the "user A", that is, a distribution device suitable to distribute the "content A" to the "user A". In this case, the "distribution device A" is selected as the arrangement destination device (or storage destination device) on which the "content A" is arranged (or stored).

In a case where the access restriction information of the user at the distribution destination has been registered and the user interest information of the user at the distribution destination has not been registered, a distribution device satisfying a condition for the access restrictions indicated by the access restriction information (for example, the condition for the domain) is selected as the arrangement destination device on which the "content A" is arranged from among distribution devices supporting Internet distribution. In a case where the user interest information of the user at the distribution destination has been registered and the access restriction information of the user at the distribution destination has not been registered, a distribution device satisfying a condition for the user's interest indicated by the user interest information (for example, the condition in which emphasis is placed on performance) is selected as the arrangement destination device on which the "content A" is arranged from among distribution devices supporting Internet distribution.

In a case where neither the access restriction information nor the user interest information of the user at the distribution destination has been registered, a distribution device supporting Internet distribution is selected as the arrangement destination device (or storage destination device) on which the "content A" is arranged (or stored). In this case, if there are multiple distribution devices supporting Internet distribution, a specific distribution device is selected as the arrangement destination device (or storage destination device) from among the multiple distribution devices in accordance with a predetermined condition. For example, a distribution device with level "A" of the "cost" is selected as the arrangement destination device (or storage destination device). It will be anticipated that a distribution device may be selected in accordance with any other condition.

In a case where the content to be distributed is content that does not support Internet distribution, the distribution of the content to the terminal device 16 is prohibited. Further, in a case where no distribution device supporting Internet distribution has been registered in the content distribution system, the distribution of the content to the terminal device 16 is prohibited. In these cases, information indicating the prohibition of the distribution of the content to be distributed is sent from the distribution management device 10A to the terminal device 16 and is displayed.

In the following, by way of example, the content to be distributed is the "content A", and the "distribution device A" has been selected as the distribution destination device (or storage destination device) on which the "content A" is arranged (or stored).

In a case where the "content A" has not been arranged (or stored) on the "distribution device A" (for example, the distribution device 12), the distribution device selection unit 28 sends the "content A" to the "distribution device A" to store the "content A" on the "distribution device A" (S47). Then, the distribution device selection unit 28 obtains from the "distribution device A" the URL indicating the storage location of the "content A" on the "distribution device A" (S48). The URL is registered in the content arrangement location management table by the content management unit 26 (S49). Accordingly, the state of the arrangement of the "content A" is managed in the content arrangement location management table.

Then, the distribution device selection unit 28 outputs the URL indicating the storage location of the "content A" (S50). The URL is transmitted to the terminal device 16 from the first communication unit 20 (S51). Then, the terminal device 16 accesses the "distribution device A" having the storage location indicated by the URL, and obtains the "content A" from the "distribution device A" (S52).

As described above, according to the second exemplary embodiment, in a case where access restrictions have been set for the content user (the terminal device at the distribution destination), a distribution device satisfying a condition for the access restrictions is selected, and the content to be distributed is arranged (or stored) on the selected distribution device. Further, in a case where the interest of the content user has been registered, a distribution device satisfying a condition for the interest is selected. This may eliminate the need for the content provider, the administrator, or any other suitable entity to manually select a distribution device suitable for the distribution of the content while taking into account access restrictions for the content user or the interest of the content user. For example, even if the content provider, the administrator, or any other suitable entity has no knowledge about a distribution device satisfying a condition for the access restrictions for the content user or the interest of the content user, the content is arranged on a distribution device suitable for the distribution of the content.

Third Exemplary Embodiment

Next, a content distribution system according to a third exemplary embodiment will be described. In the content distribution system according to the third exemplary embodiment, either the distribution management device 10 according to the first exemplary embodiment illustrated in FIG. 2 or the distribution management device 10A according to the second exemplary embodiment illustrated in FIG. 8 may be used. In the following description, the distribution management device 10A is used.

In the third exemplary embodiment, a distribution device is selected by taking into account a condition for geographical distribution. FIG. 14 illustrates an example of a distribution device management table. The distribution device management table corresponds to an example of distribution device attribute information, and is information stored in the distribution device management unit 24. In the distribution device management table, for each distribution device, a distribution device identifier for identifying the distribution device, information indicating a communication path (for either Internet distribution or intranet distribution) supported by the distribution device, information indicating the cost of the distribution device, information indicating geographic restrictions for content distribution, and other attribute information are associated with one another. The distribution device management table may not necessarily include the information indicating the cost. The other attribute information includes, for example, the information contained in the distribution device management table illustrated in FIG. 9, namely, the domain information, the IP address range, the information related to performance, and the information related to ecological sustainability. One or more of the attributes described above may be included in the distribution device management table, or other attributes such as access restriction information or user interest information may not be included in the distribution device management table. Each time a new distribution device is registered in the content distribution system, information related to the distribution device is added to the distribution device management table.

In the distribution device management table, for example, a "distribution device A" does not support distribution to China due to the geographic restrictions for content distribution. That is, access to the distribution device A from within China is prohibited. On the other hand, no geographic restriction for content distribution is imposed on a "distribution device B", a "distribution device C", and a "distribution device D", and the "distribution device B", the "distribution device C", and the "distribution device D" support distribution to all over the world. That is, access to the "distribution device B", the "distribution device C", and the "distribution device D" from all over the world is allowed.

Figure 15:
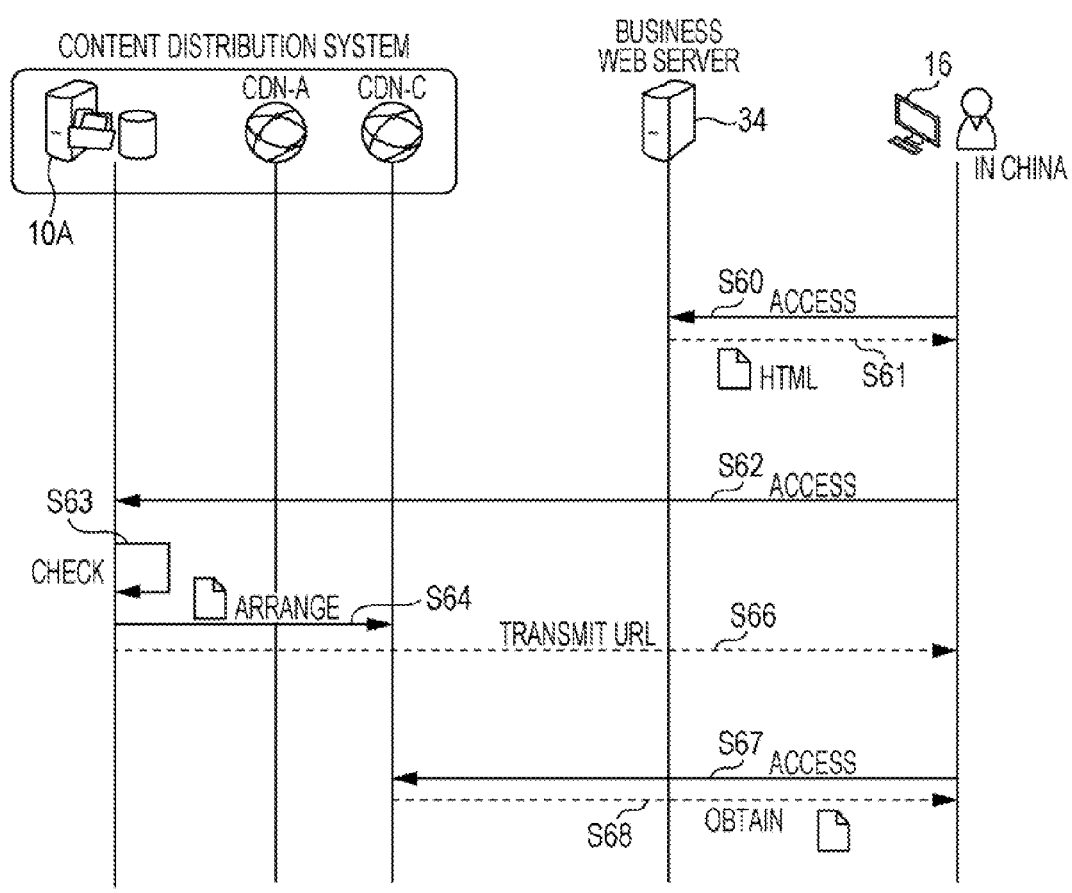
FIG. 15 is a sequence diagram illustrating a process according to a third exemplary embodiment.

In the following, a description will be given of a process performed by the content distribution system according to the third exemplary embodiment. FIG. 15 is a sequence diagram illustrating the process.

As in the first and second exemplary embodiments described above, content to be distributed is registered in the distribution management device 10A. For example, the process of steps S30 and S31 illustrated in FIG. 12 is executed, and the content and other attribute information are registered in the distribution management device 10A.

Then, as in the first and second exemplary embodiments, a content user (a user at a distribution destination) accesses, for example, the business Web server 34 by using a terminal device (S60). The access is implemented by using, for example, a web browser. By way of example, the terminal device 16 is used. The business Web server 34 dynamically creates an HTML file, and the HTML file is sent to a web browser on the terminal device 16 (S61). The HTML file contains the URL of the distribution management device 10A as a URL for obtaining the content. The HTML file further includes a content identifier for identifying the content to be distributed.

Then, the web browser on the terminal device 16 accesses the URL contained in the HTML file (S62). As described above, since the URL is the URL of the distribution management device 10A, access from the terminal device 16 to the distribution management device 10A is achieved. At this time, the content identifier of the content to be distributed is sent from the terminal device 16 to the distribution management device 10A.

In the distribution management device 10A, the distribution device selection unit 28 checks the management information (i.e., the distribution device management table, the content management table, the access restriction management table, and the user interest management table) (S63), and arranges (or stores) the content to be distributed (i.e., the content corresponding to the content identifier sent from the terminal device 16) on a specific distribution device (S64) in accordance with a condition regarding the content to be distributed or the user at the distribution destination.

For example, it is assumed that the content distribution system includes CDN-A and CDN-C as distribution devices. By way of example, the CDN-A and the CDN-C are connected to the Internet, and have a function of distributing content via the Internet. The CDN-A is a default CDN (or distribution device), and is, for example, the "distribution device A" illustrated in FIG. 14. The CDN-A (distribution device A) does not support Internet distribution to China, the cost of which is relatively low. The CDN-C is, for example, the "distribution device B" illustrated in FIG. 14. The CDN-C (or distribution device C) supports Internet distribution to all over the world, the cost of which is set low.

If the distribution management device 10A is accessed from the terminal device 16 in China, the content to be distributed is arranged (or stored) on the CDN-C supporting Internet distribution to all over the world rather than on the default CDN-A that does not support Internet distribution to China. In a case where conditions for access restrictions and the user's interest are taken into account in addition to the geographic restrictions for content distribution, a CDN (or distribution device) also satisfying these conditions is selected, and the content to be distributed is arranged on the selected CDN.

When the content to be distributed is arranged on the CDN-C, the content management unit 26 adds content arrangement information concerning the content to the content arrangement location management table. Then, a URL indicating the arrangement location of the content is sent from the distribution management device 10A to the terminal device 16 (S66). The URL is information indicating a storage location on the CDN-C. In a case where the content to be distributed has already been arranged on the CDN-C, the arrangement process in step S64 is not necessary.

Then, the web browser on the terminal device 16 accesses the URL sent from the distribution management device 10A (S67). Since the URL indicates the storage location on the CDN-C, access from the terminal device 16 to the CDN-C is achieved. Then, the web browser obtains the content from the storage location indicated by the URL (S68).

As described above, according to the third exemplary embodiment, a distribution device satisfying a geographical condition of a content user (a terminal device at a distribution destination) is selected, and the content to be distributed is arranged (or stored) on the selected distribution device. That is, in a case where geographic restrictions for content distribution have been set, the content is arranged on a distribution device on which the restrictions for content distribution are not imposed, and is distributed to a terminal device. In the example described above, even upon access from the terminal device 16 at a distribution destination which is in China, the content is arranged on a distribution device (e.g., the CDN-C) to which access from within China is allowed, and is then distributed from the distribution device to the terminal device 16. This may eliminate the need for the content provider, the administrator, or any other suitable entity to manually select a distribution device suitable for the distribution of the content while taking into account geographic restrictions for content distribution which are imposed on a content user. For example, even if the content provider, the administrator, or any other suitable entity has no knowledge about a distribution device satisfying a condition for the geographic restrictions for content distribution, the content is arranged on a distribution device suitable for the distribution of the content.

Fourth Exemplary Embodiment

Next, a content distribution system according to a fourth exemplary embodiment will be described. In the content distribution system according to the fourth exemplary embodiment, either the distribution management device 10 according to the first exemplary embodiment illustrated in FIG. 2 or the distribution management device 10A according to the second exemplary embodiment illustrated in FIG. 8 may be used. In the following description, the distribution management device 10 is used.

In the fourth exemplary embodiment, the control unit 32 of the distribution management device 10 includes an authentication unit. When a terminal device accesses the distribution management device 10 via the Internet, the authentication unit performs user authentication. If the authentication is successful, the content to be distributed is arranged on a specific distribution device and is then distributed to the terminal device. In the fourth exemplary embodiment, user authentication information is stored in advance in the storage unit 30 of the distribution management device 10, for example. Examples of the user authentication information include a user identifier and a password. The fourth exemplary embodiment will be described in detail hereinafter.

FIG. 16 illustrates an example of a content management table. The content management table is an example of the content attribute information, and is information stored in the content management unit 26. In the content management table, for each piece of content, a content identifier for identifying the piece of content, information indicating a communication path supported by the piece of content, information indicating conditions for Internet distribution, and information indicating restrictions are associated with one another. The conditions for Internet distribution are conditions for distributing the content to be distributed via the Internet. The conditions define, for example, access from an authenticated user, access from within a specific IP address range, access from a specific authenticated user, and so forth. The restrictions are conditions regarding security for content to be distributed, and are restrictions imposed on use of the content. The restrictions include, for example, encryption with a public key of a user, and expiry which allows the content to be obtained. For example, each time a new piece of content is registered in the distribution management device 10, the attribute information of the piece of content is added to the content management table.

For instance, "content A" supports both distribution via the Internet and distribution via an intranet. The "content A" is distributed via the Internet only to authenticated users. In addition, the encryption of the "content A" which is to be arranged on a distribution device is set as the restrictions. Further, "content B" is distributed only to terminal devices within a specific IP address range, and a 24-hour expiry is set as a time period for which the "content B" can be obtained. Further, "content C" is distributed only to specific users among authenticated users. Additionally, a one-hour expiry is set as a time period for which the "content C" can be obtained. The restrictions are set as options, and may not necessarily be included in the content management table.

Figures 17, 18:
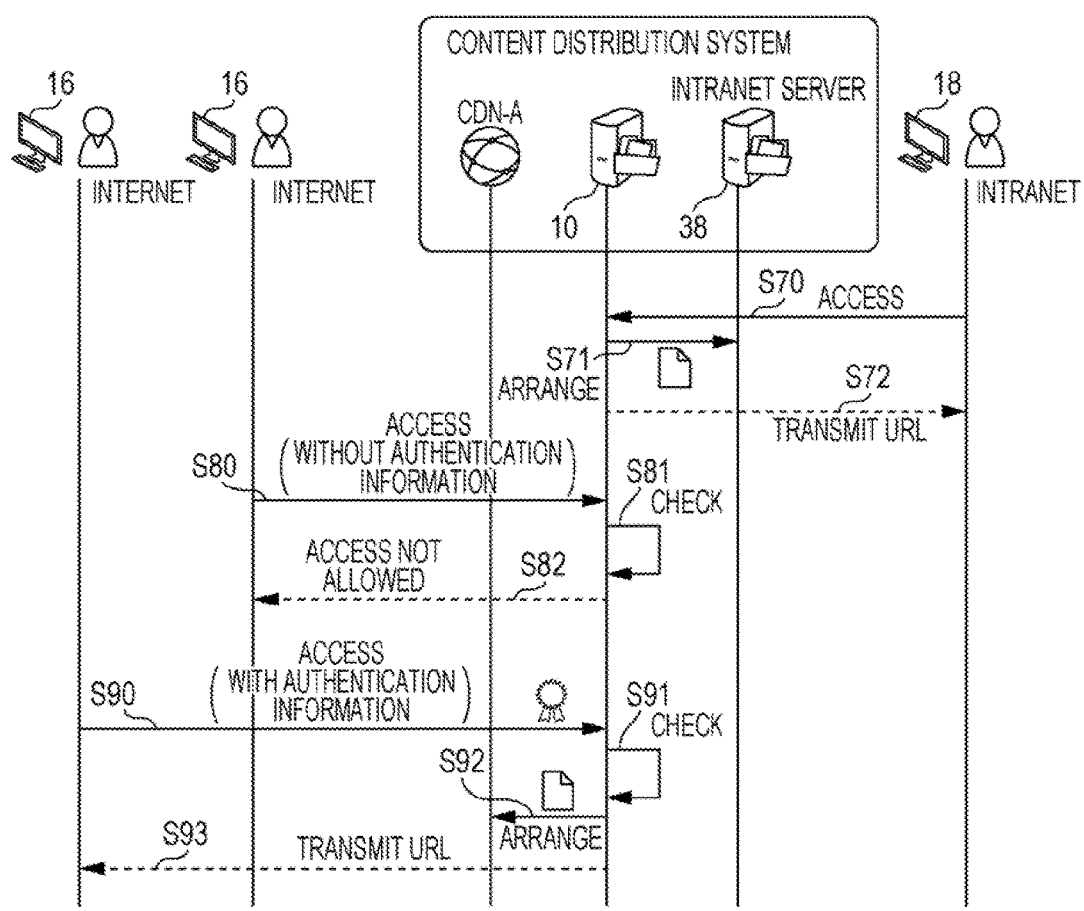
FIG. 17 illustrates an example of an access-allowed user management table.
FIG. 18 is a sequence diagram illustrating a process according to a fourth exemplary embodiment.

FIG. 17 illustrates an example of an access-allowed user management table. The access-allowed user management table is information stored in the storage unit 30, for example. The access-allowed user management table is information indicating "specific authenticated users" in the content management table illustrated in FIG. 16. The access-allowed user management table defines, for content which is to be distributed only to specific authenticated users, the identifier of a user to which the content is allowed to be distributed. For example, the "content C" is content which is allowed to be distributed to a "user A", a "user X", and a "user Y". The access-allowed user management table may not be used when the content management table does not define "specific authenticated users". For example, each time a new piece of content is registered in the distribution management device 10, the identifier of a user who is allowed to access the piece of content is added to the access-allowed user management table. For example, a content provider determines a user who is allowed to access specific content.

In the following, a description will be given of a process performed by the content distribution system according to the fourth exemplary embodiment. FIG. 18 is a sequence diagram illustrating the process.

As in the first exemplary embodiment described above, content to be distributed is registered in the distribution management device 10. For example, the process of step S01 illustrated in FIG. 6 is executed, and content and other attribute information are registered in the distribution management device 10. It is assumed that the content supports both intranet distribution and Internet distribution, and intranet distribution does not require user authentication while Internet distribution requires user authentication.

Then, as in the first exemplary embodiment, a content user (a user at a distribution destination) accesses, for example, a business Web server by using a terminal device. The access is implemented by using, for example, a web browser. The business Web server sends an HTML file to the terminal device. The HTML file contains the URL of the distribution management device 10 as a URL for obtaining the content. The HTML file further includes a content identifier for identifying the content to be distributed.

For example, the terminal device 18 is used. As illustrated in FIG. 1, the terminal device 18 is a device connected to the communication path N2, which is an intranet. A web browser on the terminal device 18 accesses the URL included in the HTML file (S70). Accordingly, access from the terminal device 18 to the distribution management device 10 is achieved. At this time, the content identifier of the content to be distributed is sent from the terminal device 18 to the distribution management device 10.

In the distribution management device 10, the distribution device selection unit 28 checks the management information (i.e., the distribution device management table, the content management table, and the access-allowed user management table), and arranges (or stores) the content to be distributed (i.e., the content corresponding to the content identifier sent from the terminal device 18) on a specific distribution device (S71) in accordance with a condition regarding the content to be distributed or the user. Since the terminal device 18 has accessed the distribution management device 10 via an intranet, the content to be distributed is arranged on a distribution device supporting intranet distribution (e.g., an intranet server 38) without any request for user authentication. Then, a URL indicating the arrangement location of the content is sent from the distribution management device 10 to the terminal device 18 (S72). The URL is information indicating a storage location on the intranet server 38. In a case where the content to be distributed has already been arranged on the intranet server 38, the arrangement process in step S71 is not necessary.

Then, the web browser on the terminal device 18 accesses the URL sent from the distribution management device 10, and obtains the content from the storage location indicated by the URL. That is, the content is obtained from the intranet server 38.

In another example, the terminal device 16 is used. As illustrated in FIG. 1, the terminal device 16 is a terminal connected to the communication path N1, which is the Internet. The web browser on the terminal device 16 accesses the URL included in the HTML file (S80). At this time, the content identifier of the content to be distributed is sent from the terminal device 16 to the distribution management device 10.

In the distribution management device 10, the distribution device selection unit 28 checks the management information (i.e., the distribution device management table, the content management table, and the access-allowed user management table) (S81). The terminal device 16 has accessed the distribution management device 10 via the Internet. In a case where the content to be distributed is "content A", as illustrated in FIG. 16, the "content A" is distributed via the Internet only to authenticated users. Thus, user authentication is necessary for the distribution of the "content A". Since no user authentication information is sent from the terminal device 16 at the time of access, the authentication fails. In this case, information indicating that access is not allowed is transmitted from the distribution management device 10 to the terminal device 16 and is displayed (S82).

In still another example, the terminal device 16 is used. The web browser on the terminal device 16 accesses the URL included in the HTML file (S90). At this time, content identifier of the content to be distributed and user authentication information are sent from the terminal device 16 to the distribution management device 10.

In the distribution management device 10, the distribution device selection unit 28 checks the management information (i.e., the distribution device management table, the content management table, and the access-allowed user management table) (S91). The terminal device 16 has accessed the distribution management device 10 via the Internet. In a case where the content to be distributed is "content A", the "content A" is distributed via the Internet only to authenticated users. Since user authentication information is sent from the terminal device 16 at the time of access, the authentication unit performs an authentication process. In a case where user authentication information corresponding to the user authentication information sent from the terminal device 16 (for example, user authentication information that matches the user authentication information sent from the terminal device 16) has been stored in the storage unit 30, the authentication is successful. On the other hand, in a case where the user authentication information corresponding to the user authentication information sent from the terminal device 16 has not been stored in the storage unit 30, the authentication fails.

If the authentication is successful, the content to be distributed is arranged on a distribution device supporting Internet distribution (for example, CDN-A) (S92). Then, a URL indicating the arrangement location of the content is sent from the distribution management device 10 to the terminal device 16 (S93). The URL is information indicating a storage location on the CDN-A. In a case where the content to be distributed has already been arranged on the CDN-A, the arrangement process in step S92 is not necessary. As an optional process, an expiry may be set for the distribution of the content or the content may be encrypted. Then, the web browser on the terminal device 16 accesses the URL sent from the distribution management device 10, and obtains the content from the storage location indicated by the URL. For example, the content is obtained from the CDN-A.

If the authentication has failed, information indicating that access is not allowed is transmitted from the distribution management device 10 to the terminal device 16 and is displayed.

As described above, according to the fourth exemplary embodiment, security for an object may be guaranteed when the object is to be distributed via the Internet. For example, even an object which is usually distributed to intranet users is also distributed via the Internet so long as conditions regarding security are satisfied.

Fifth Exemplary Embodiment

Next, a content distribution system according to a fifth exemplary embodiment will be described. In the content distribution system according to the fifth exemplary embodiment, the distribution management device 10A according to the third exemplary embodiment is used.

In the fifth exemplary embodiment, when a geographical condition of a content user (a user at a distribution destination) is changed in a case where a distribution device has been selected by taking into account a condition for geographical distribution, the content to be distributed is rearranged on a storage destination device in accordance with the change of the geographical condition.

Figure 19:
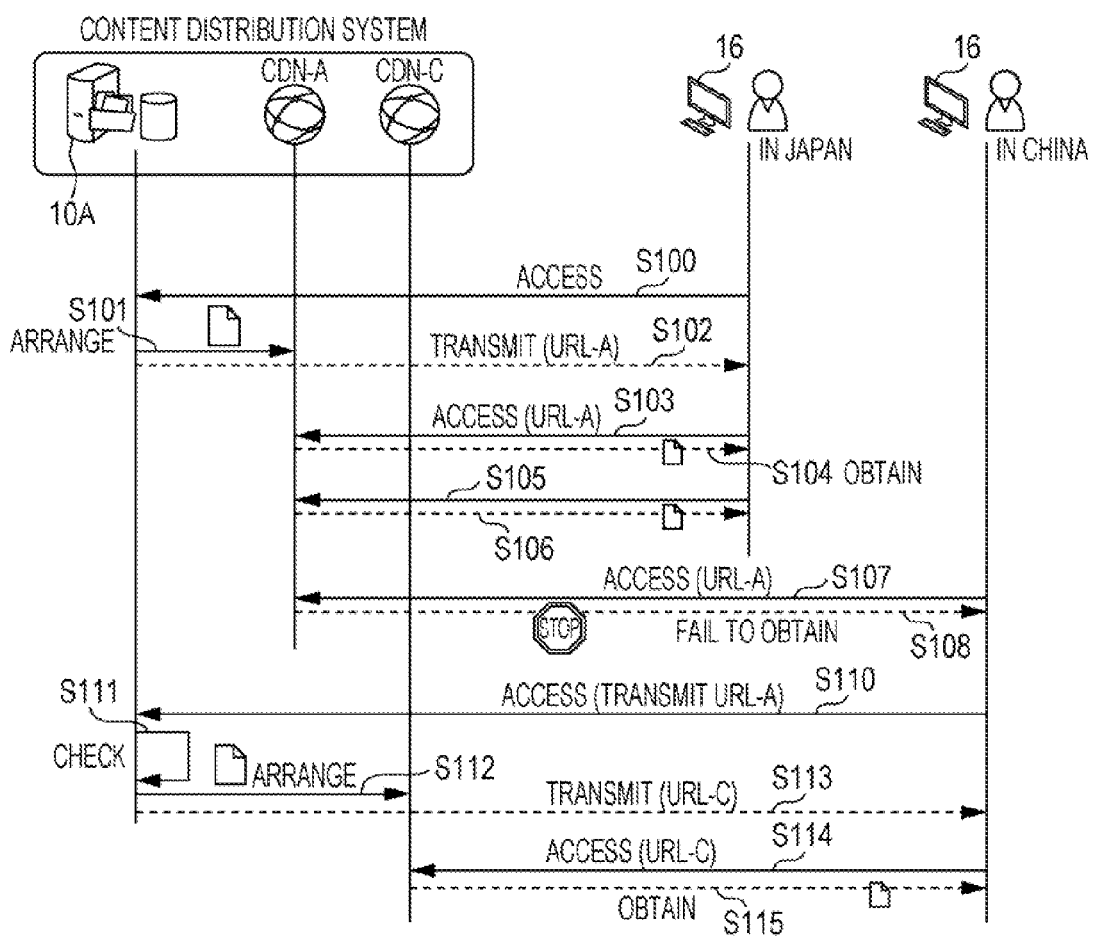
FIG. 19 is a sequence diagram illustrating a process according to a fifth exemplary embodiment.

In the following, a description will be given of a process performed by the content distribution system according to the fifth exemplary embodiment. FIG. 19 is a sequence diagram illustrating the process.

As in the third exemplary embodiment described above, content to be distributed and other attribute information are registered in the distribution management device 10A.

Then, a content user (a user at a distribution destination) accesses, for example, a business Web server by using the terminal device 16 connected to the Internet. The access is implemented by using, for example, a web browser. The business Web server sends an HTML file to the terminal device 16. The HTML file contains the URL of the distribution management device 10A as a URL for obtaining the content. The HTML file further includes a content identifier for identifying the content to be distributed.

Then, a web browser on the terminal device 16 accesses the URL included in the HTML file (S100). The access is provided from Japan, for example. At this time, the content identifier of the content to be distributed is sent from the terminal device 16 to the distribution management device 10A.

In the distribution management device 10A, the distribution device selection unit 28 checks the management information (i.e., the distribution device management table, the content management table, the access restriction management table, and the user interest management table), and arranges (or stores) the content to be distributed (i.e., the content corresponding to the content identifier sent from the terminal device 16) on a specific distribution device (S101) in accordance with a condition regarding the content to be distributed or the user at the distribution destination.

For example, it is assumed that the content distribution system includes CDN-A and CDN-C as distribution devices. By way of example, the CDN-A and the CDN-C are connected to the Internet, and have a function of distributing content via the Internet. The CDN-A is a default CDN (or distribution device), and is, for example, the "distribution device A" illustrated in FIG. 14. The CDN-A (or distribution device A) does not support Internet distribution to China, the cost of which is relatively low. The CDN-C is, for example, the "distribution device C" illustrated in FIG. 14. The CDN-C (or distribution device C) supports Internet distribution to all over the world. That is, the CDN-C supports Internet distribution to China.

If the distribution management device 10A is accessed from the terminal device 16 in Japan, the content to be distributed is arranged (or stored) on the default CDN-A, for example. In a case where conditions for access restrictions and the user's interest are taken into account in addition to the geographic restrictions for content distribution, a CDN (or distribution device) also satisfying these conditions is selected, and the content to be distributed is arranged on the selected CDN.

When the content to be distributed is arranged on the CDN-A, the content management unit 26 adds content arrangement information concerning the content to the content arrangement location management table. For example, the content to be distributed is "content A". In this case, in the content arrangement location management table illustrated in FIG. 5, the identifier of the "content A", the identifier of the distribution device (i.e., the distribution device A), and URL-A indicating a storage location on the CDN-A (i.e., the distribution device A) are associated with one another. Then, the URL-A indicating the arrangement location of the content is sent from the distribution management device 10A to the terminal device 16 (S102). In a case where the content to be distributed has already been arranged on the CDN-A, the arrangement process in step S101 is not necessary.

Then, the web browser on the terminal device 16 accesses the URL-A (S103). Since the URL-A indicates the storage location on the CDN-A, access from the terminal device 16 to the CDN-A is achieved. Then, the web browser obtains the content from the storage location indicated by the URL-A (S104).

Subsequently, the following situation is assumed: the content user directly accesses the URL-A (S105) and obtains the content from the CDN-A without accessing the distribution management device 10A (S106). Since the CDN-A supports Internet distribution to Japan, the content is provided to the terminal device 16 from the CDN-A when the CDN-A is accessed from the terminal device 16 in Japan. In this case, it is anticipated that the content user might move to China and directly access the CDN-A by using the terminal device 16 from within China (S107). However, a problem arises in that the content is not provided from the CDN-A to the terminal device 16 (S108) since the CDN-A does not support Internet distribution to China.

In the fifth exemplary embodiment, in order to address the problem described above, the terminal device 16 transmits a URL that has been obtained and to which access has been prohibited (i.e., the URL-A) to the distribution management device 10A (S110).

In the distribution management device 10A, the distribution device selection unit 28 checks the management information (i.e., the content arrangement location management table, the distribution device management table, the content management table, the access restriction management table, and the user interest management table) (S111), and rearranges the content to be distributed on another distribution device (S112). Specifically, the following process is executed.

As described above, in the content arrangement location management table, the content and the URL of the arrangement location have been associated with each other. Accordingly, the content arrangement location management table is referred to, allowing identification of content (i.e., the content A) corresponding to the URL (i.e., the URL-A) to which access has been prohibited. In addition, since the distribution management device 10A has been accessed from the terminal device 16 in China, the CDN-C supporting Internet distribution to China is selected as the distribution device. Then, the content A to be distributed is arranged on the CDN-C. In a case where conditions for access restrictions and the user's interest are taken into account in addition to the geographic restrictions for content distribution, a CDN (or distribution device) also satisfying these conditions is selected, and the content to be distributed is arranged on the selected CDN.

When the content to be distributed is arranged on the CDN-C, the content management unit 26 adds content arrangement information concerning the content to the content arrangement location management table. Then, a URL-C indicating the arrangement location of the content is sent from the distribution management device 10A to the terminal device 16 (S113).

Then, the web browser on the terminal device 16 accesses the URL-C (S114). Since the URL-C indicates a storage location on the CDN-C, access from the terminal device 16 to the CDN-C is achieved. Then, the web browser obtains the content from the storage location indicated by the URL-C (S115).

As described above, according to the fifth exemplary embodiment, after content has been arranged on a specific distribution device, if access to the specific distribution device is prohibited due to the geographic restrictions for content distribution, the content is rearranged on another distribution device to which access is allowed. Accordingly, the content is provided to the content user.

According to the first to fifth exemplary embodiments described above, content is arranged on a distribution device suitable for each user or each terminal device in accordance with the situation of the user or the terminal device.

In the first to fifth exemplary embodiments described above, content to be distributed may be arranged on plural distribution devices satisfying conditions. In this case, URLs indicating the arrangement locations on the respective distribution devices are sent to a terminal device. A content user may select a specific distribution device from among the plural distribution devices, and may obtain the content from the specific distribution device.

The distribution management devices 10 and 10A described above are each implemented by cooperation of hardware resources and software, by way of example. Specifically, each of the distribution management devices 10 and 10A includes a processor such as a central processing unit (CPU) (not illustrated). The processor reads and executes a program stored in a storage device (not illustrated), thereby implementing the functions of the individual units of the corresponding one of the distribution management devices 10 and 10A. The program is stored in a storage device through a recording medium such as a compact disc (CD) or a digital versatile disc (DVD) or through a communication path such as a network. Alternatively, the individual units of each of the distribution management devices 10 and 10A may be implemented by, for example, hardware resources such as a processor and an electronic circuit. In this implementation, a device such as a memory may be used. In another example, the individual units of each of the distribution management devices 10 and 10A may be implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores information on a plurality of storage destination devices and a plurality of pieces of condition information in association with each other, wherein each of the plurality of pieces of condition information indicates a condition of a user that needs to be satisfied to access a corresponding one of the plurality of storage destination devices; and
a processor programmed to:
receive a request from a requesting user to access content;
in response to receiving the request, obtain information on an attribute of the requesting user;
perform a comparison between the obtained information on the attribute of the requesting user and the plurality of pieces of condition information;
select one of the plurality of storage destination devices based on a result of the comparison, the selected one of the plurality of storage destination devices being associated with condition information that is satisfied by the attribute of the requesting user;
store the content in the selected one of the plurality of storage destination devices; and
transmit, to the requesting user, information for accessing the selected one of the plurality of storage destination devices in which the content is stored.

2. The information processing apparatus according to claim 1, wherein
the memory further stores information on an attribute of at least one of cost, performance, and ecological sustainability of each of the plurality of storage destination devices,
the attribute of the requesting user comprises at least one measure among the cost, the performance, and the ecological sustainability, and
the processor is programmed to store the content in the selected one of the plurality of storage destination devices whose attribute matches the attribute of the requesting user.

3. The information processing apparatus according to claim 1, wherein
the memory further stores, for each piece of content, information indicating a storage destination device on which the piece of content is storable, and
the processor is programmed to store the requested content in the selected one of the plurality of storage destination devices on which the requested content is storable and which has the condition information satisfied by the attribute of the requesting user.

4. The information processing apparatus according to claim 2, wherein
the memory further stores, for each piece of content, information indicating a storage destination device on which the piece of content is storable,
the processor is programmed to store the requested content in the selected one of the plurality of storage destination devices on which the requested content is storable and which has the condition information satisfied by the attribute of the requesting user.

5. The information processing apparatus according to claim 1, wherein
the processor is programmed to:
accept a request for storing content; and
upon receipt of the request for storing content, store, on a default storage destination device, the content requested to be stored.

6. The information processing apparatus according to claim 2, wherein
the processor is programmed to:
accept a request for storing content; and
upon receipt of the request for storing content, store, on a default storage destination device, the content requested to be stored.

7. The information processing apparatus according to claim 3, wherein
the processor is programmed to:
accept a request for storing content; and
upon receipt of the request for storing content, store, on a default storage destination device, the content requested to be stored.

8. The information processing apparatus according to claim 4, wherein
the processor is programmed to:
accept a request for storing content; and
upon receipt of the request for storing content, store, on a default storage destination device, the content requested to be stored.

9. A non-transitory computer readable medium storing a program causing a computer to execute a process for information processing, the computer storing information on a plurality of storage destination devices and a plurality of pieces of condition information in association with each other, wherein each of the plurality of pieces of condition information indicates a condition of a user that needs to be satisfied to access a corresponding one of the plurality of storage destination devices, the process comprising:
receiving a request from a requesting user to access content;
in response to receiving the request, obtaining information on an attribute of the requesting user;
performing a comparison between the obtained information on the attribute of the requesting user and the plurality of pieces of condition information;
selecting one of the plurality of storage destination devices based on a result of the comparison, the selected one of the plurality of storage destination devices associated with condition information that is satisfied by the attribute of the requesting user;
storing the content in the selected one of the plurality of storage destination devices; and
transmitting, to the requesting user, information for accessing the selected one of the plurality of storage destination devices in which the content is stored.

10. An information processing method comprising:
providing a memory that stores information on a plurality of storage destination devices and a plurality of pieces of condition information in association with each other, wherein each of the plurality of pieces of condition information indicates a condition of a user that needs to be satisfied to access a corresponding one of the plurality of storage destination devices;
receiving a request from a requesting user to access content;
in response to receiving the request, obtaining information on an attribute of the requesting user;
performing a comparison between the obtained information on the attribute of the requesting user and the plurality of pieces of condition information;

selecting one of the plurality of storage destination devices based on a result of the comparison, the selected one of the plurality of storage destination devices associated with condition information that is satisfied by the attribute of the requesting user;

storing the content in the selected one of the plurality of storage destination devices; and transmitting, to the requesting user, information for accessing the selected one of the plurality of storage destination devices in which the content is stored.

11. The information processing apparatus according to claim 1, wherein the information transmitted to the requesting user includes (i) an identifier of the selected one of the plurality of storage destination devices and (ii) a location of the content stored in the selected one of the plurality of storage destination devices.

12. The information processing apparatus according to claim 1, wherein the memory stores information indicating, for each of a plurality of users, which attribute is prioritized in performing the comparison to select a storage destination device.

13. The information processing apparatus according to claim 1, wherein the memory stores (i) access restriction information and (ii) user interest information for each of a plurality of users;

the access restriction information includes at least one of a domain to which access by a respective user is allowed, and an IP address range to which access by the respective user is allowed; and the user interest information indicates a measure on which the respective user places emphasis for selecting a storage destination device, the measure including at least one of a cost, a performance, and an ecological sustainability.

14. The information processing apparatus according to claim 13, wherein the processor is programmed to:

select one of the plurality of storage destination devices based on:
(i) the result of the comparison between the attribute of the requesting user and the plurality of pieces of condition information associated with the plurality of storage destination devices,
(ii) the access restriction information, and
(iii) the user interest information.

15. The information processing apparatus according to claim 13, wherein the selected storage destination device is included in the domain or the IP address range to which the access by the requesting user is allowed according to the access restriction information.

16. The information processing apparatus according to claim 13, wherein the selected storage destination device is associated with one of the plurality of pieces of condition information that matches the measure on which the respective user places emphasis according to the user interest information.

* * * * *